March 5, 1940.  N. B. AKITT  2,192,171
CAR TRUCK
Filed June 6, 1938   2 Sheets-Sheet 1
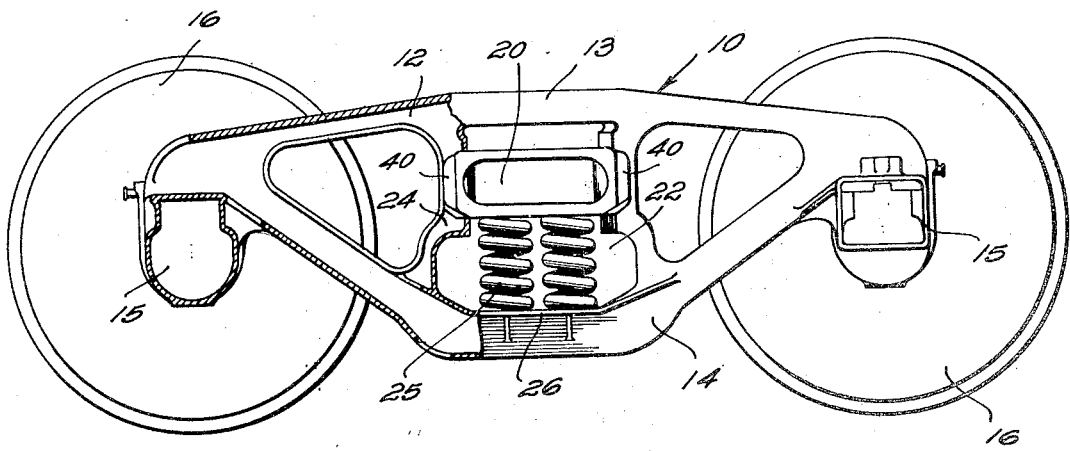
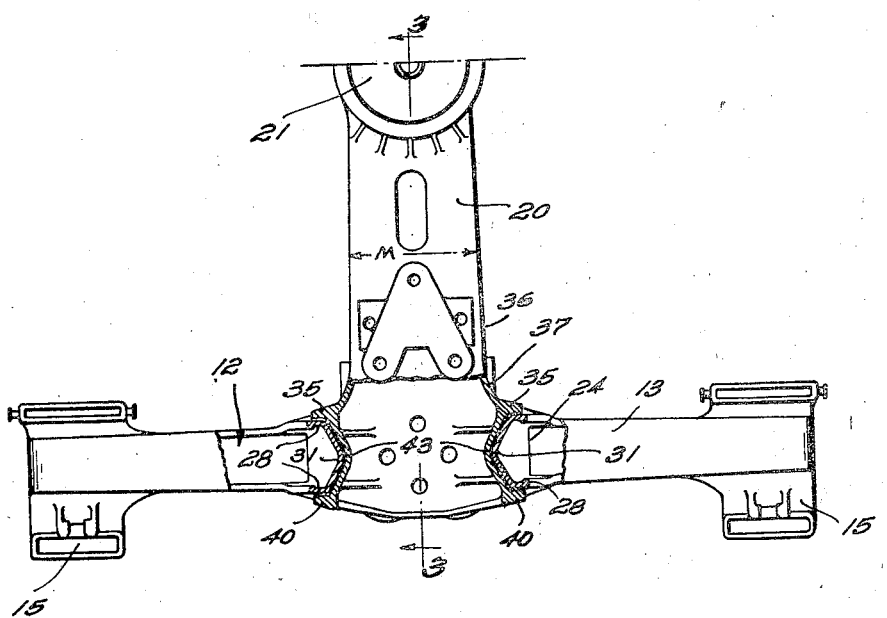
Inventor
Norman B. Akitt
By Watson, Cole, Grindle & Watson
Attorney March 5, 1940.  N. B. AKITT  2,192,171
CAR TRUCK
Filed June 6, 1938  2 Sheets-Sheet 2
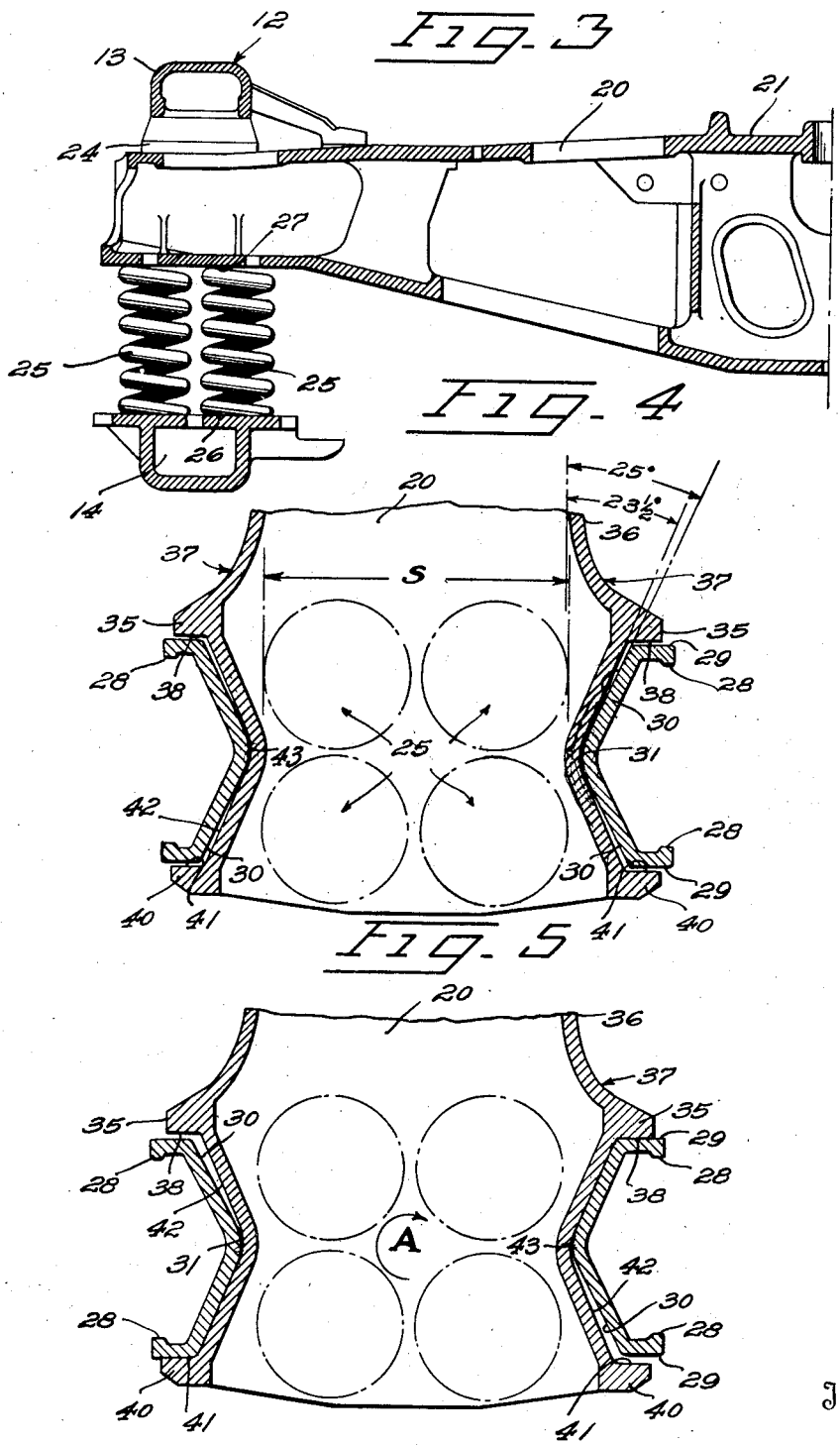
Inventor
Norman B. Akitt
By Watson, Cole, Grindle & Watson
Attorney Patented Mar. 5, 1940

2,192,171

UNITED STATES PATENT OFFICE 2,192,171

CAR TRUCK

Norman B. Akitt, Troy, N. Y., assignor to Adirondack Foundries and Steel Incorporated, Watervliet, N. Y., a corporation of New York Application June 6, 1938, Serial No. 212,202

5 Claims. (Cl. 105—197.1)

This invention relates to car trucks and more particularly to the bolster, spring, and side frame constructions, arrangements, and connections.

The general object of the invention is the provision of a novel car truck embodying improvements in the means for connecting the ends of the bolster with the side frames, and in the disposition of the bolster supporting springs for the most efficient functioning thereof.

More particularly, the invention has for its object the provision in a spring plankless car truck of a bolster and of side frame columns having mutually contacting surfaces of novel and improved configurations, whereby the bolster may adequately perform the function of maintaining the squared relation of the truck side frames, but whereby at the same time the arrangement may be made self-alining so that sufficient flexibility is provided for the side frames to assume their proper longitudinal position during travel. The present invention also provides exceedingly large wearing surfaces between the truck columns and the bolster when the bolster is angled or rotated in a horizontal plane under certain conditions of operation, as when rounding a curve or under the continual alternate surging ahead of one side frame or the other on a straight track.

The arrangement according to the present invention not only retains all of the advantages of the spring plankless truck but also is adaptable to spring plankless trucks either of the standard type or of the double truss type.

In its preferred embodiment, the invention contemplates the provision of side frames having columns of normal spacing which, together with the tension and compression elements of the frame, define windows of widths corresponding generally to the width of the bolster proper and also approximating the width of the spring grouping employed. The spring grouping illustrated and described herein is a conventional or standard one and represents the preferred arrangement; but, of course, variations may be made within the scope of the claims.

The upper portions of the side frame columns are of a substantially triangular or wedge shaped configuration in horizontal section and are also provided with outwardly directed faces lying in planes approximately parallel with the longitudinal center line of the truck. Each end of the bolster of the truck is provided with a pair of spaced outstanding guide lugs upon each side thereof, and these lugs define between them a wear or guiding surface comprising spaced inwardly facing portions for contacting on occasion with the corresponding outwardly directed faces on the columns, and a wedge shaped or substantially triangular surface approximating the contour of the inwardly directed triangular surfaces on the column. The apices of these mating triangular guide surfaces define the width of the window opening of the side frame at this point which, as already pointed out, is of approximately the same width as that of the main portion of the bolster and also wide enough to accommodate the spring grouping.

The angularity of the indentations between the bolster lugs is somewhat greater than that of the adjacent surfaces of the columns, the configuration being such that, when the bolster is angled, nearly one-half of the total area of the mutually adjacent wedge shaped surfaces of the bolster and column on either side is in bearing contact, as well as the substantially parallel faces on alternately opposite sides of the connection. Thus a greatly increased bearing area is provided than in prior constructions and this area is so shaped as to provide a maximum of contact under all conditions of service.

It will also be noted that, in furtherance of one object of the invention, the inclusion of the entire spring grouping within the confines of the columns, permits the maintaining of the springs as close to the central vertical plane of the side frame as possible thus avoiding unequal stressing of the springs during relative movement of the side frame and bolster.

From this it will also be apparent that a further object of the invention is to provide a novel and improved bolster for use in connection with a car truck of this general type.

Other objects and features of novelty will be apparent from the following specification when read in connection with the accompanying drawings in which one embodiment of the invention is illustrated by way of example.

In the drawings:

Figure 1 is a view in side elevation of a truck embodying the principles of the invention, a portion of one of the side frames being shown in section;

Figure 2 is a plan view of one-half of the truck; the columns and bolster being shown in horizontal section at their point of connection;

Figure 3 is a transverse vertical sectional view taken on line 3—3 of Figure 2; and Figures 4 and 5 are fragmentary horizontal sectional views, on an enlarged scale, of the bolster and side frame connection in rectilinear and angled positions respectively.

The exemplary embodiment of my invention is included in the four-wheel truck for freight cars shown in some detail in Figures 1 and 2 of the drawings, and designated generally by the reference numeral 10. The truck is of course provided with two parallel side frames, one of which is indicated at 12. Each side frame comprises an upper compression member 13 and a lower depending tension member 14, the junction of these members at the ends of the side frames being provided with journal boxes 15, which may be formed integrally with the side frames or connected thereto in any desired or conventional manner. Suitable bearings are provided within the journal boxes for the axles which are supported by the wheels 16.

The truck, being of the spring-plankless self-aligning type, is provided with a bolster 20 which alone performs the function of squaring the truck under all conditions of travel. The bolster is preferably of the sturdy hollow cast metal construction shown best in Figures 2 and 3 of the drawings; a center bearing being provided at 21, and the opposite ends of the bolster extending through the windows 22 of the side frames, these windows being outlined by the central portions of the compression member 13 and tension member 14, and the parallel vertical frame bracing and bolster guiding columns 24. The ends of the bolster 20 rest as at 27 upon the spring groups or assemblies 25 which, in the absence of the spring plank of the older form of truck, rest upon a seat 26 provided on the central portion of the tension member 14. The spring grouping may be of any desired type but the standard arrangement for a truck of this type and of average capacity is shown in the drawings as the preferred form.

The upper or guide portions of each column 24 are of the configuration clearly depicted in Figures 2, 4, and 5 of the drawings, having substantially parallel lateral flanges 28, provided with outwardly facing bolster contacting surfaces 29. Between these flanges the columns are provided with the inwardly inclined surfaces 30 which form a substantially triangular or wedge shaped guide the rounded apex of which is shown at 31. The apices of the columns on each side frame define the width of the window opening at the upper portion thereof and this width is at least that of the usual normal opening of this type of truck, that is to say, the spacing of the apices 31 is at least approximately the same as the width of the main portion of the bolster 20, for example as indicated at M.

The end portions of the bolster are wider than the intermediate portion and are provided with the inner guide lugs 35 toward which the side walls 36 of the bolster diverge as at 37. The outer faces 38 of these lugs are approximately parallel with the faces 29 of the inner flanges 28 on the columns 24, with which they are adapted to contact under certain conditions of operation. At the extreme ends of the bolster there are formed outer guide lugs 40 which have inner faces 41 similar to the corresponding faces 38 of the inner lugs and adapted to contact the outer faces 29 of the outer flanges 28. Between these lugs 35 and 40 the bolster is provided with triangular or wedge shaped indentations having the inclined side wall surfaces 42 which merge at the rounded apex 43. The walls 42 are disposed adjacent the surfaces 30 on the columns, when the bolster is in place and the apices 43 and 31 of the respective members are adapted to interfit.

In the illustrative embodiment in which an angular rotation of the bolster of approximately 1½° is allowed for, each surface 42 of the bolster makes an angle of 23½° with the axis of the latter giving the wedge shaped indentation of the bolster a spread of 133°. The corresponding surfaces 30 of the columns 24 have an angularity of 25° with the bolster axis and thus the angle between the surfaces is 130°.

It will also be noted that the spacing of the apices of the angular bearing surfaces is at least as wide as the width of the spring groupings 25 indicated at S in Figure 4. Thus the springs may be disposed closely together and also closer to the longitudinal center line of the side frame.

In assembling the truck, the ends of the bolster are inserted in the lower wider portion of the window 22 and then the mutually engaging surfaces of the bolster and guide columns are fitted together and the bolster moved upwardly into the narrower upper portion of the window, whereupon the springs 25 are inserted between the seats 26 and 27 on the side frame and the bolster respectively.

The bolster as thus formed and installed retains the truck side frames in their proper lateral positions during service, without the rigidifying effect of the spring plank. The present arrangement, however, provides sufficient flexibility within established bolster clearance limits for the whole assembly to assume the proper alignment, which is automatically determined by the curvature of the track and other conditions during travel. It is obvious that in rounding a curve, the bolster 20 will be angled or rotated in one direction or the other with respect to the side frames. Not only this, but even on a straight track, each side frame is alternately surging ahead of the other and causing relative rotation between the frames and bolster.

When the truck is in motion, the bolster very seldom rides in normal rectilinear position, and for the small periods of time during which the truck is absolutely squared up, the bearing surfaces between the curved apices 31 and 43 are ample.

When the bolster, under certain conditions of operation, is rotated with respect to the frame in the direction of the arrow A in Figure 5, the diagonally opposite inner and outer flange and lug surfaces 29 and 38 and 29 and 41 are in contact, as shown; and these would correspond in prior constructions to the only bearing or wear surfaces in contact. However, due to the novel configuration of the bolster side walls and the column guides, nearly one-half of the remaining side wall surfaces of these members are in snug bearing contact. As readily apparent, the alternately opposite surfaces 30 and 42 are almost completely in contact from the lugs 35 or 40 inwardly to the respective apices 31 and 43.

Thus during by far the greatest portion of the time of running, extremely large areas of contact are in use; and thus the truck is properly squared, wear is reduced, the entire connection is rendered stronger and more efficient, and substantial savings are effected in the weight and cost of the rolling stock.

By maintaining the normal wide spacing of the bolster guiding columns, not only is the spring group spacing maintained as described above, but the lever action is more favorable, that is, the lever arm of force applied by the side frame on the bolster to maintain the truck square, is longer.

The angles between the converging surfaces of both the bolster and the guides may be varied in practice in accordance with the permitted rotational movement of the bolster, and also various other changes and modifications may be made in the embodiment illustrated and described herein without departing from the scope of the invention except as set forth in the subjoined claims.

Having thus described the invention, what is claimed as new and desired to be secured by Letters Patent is:

1. In a spring plankless self-aligning car truck of the class described, in combination, side frames having spaced bolster guiding columns, a bolster extending from one side frame to the other and guided for vertical reciprocation and slight horizontal rotation between said columns, the end portions of said bolster being widened and provided upon opposite sides with substantially triangular or wedge-shaped indentations having two vertical inwardly convergent walls, the mutually inwardly directed apices of said indentations defining the side margins of the window opening for the reception of the bolster ends, similar wedge-shaped projections on said guide columns, each having two inwardly converging walls and an apex interfitting with the indentations of the bolster ends with a slight clearance, the angles between the converging walls of the bolster being slightly wider than the angles between the walls of the guide column projections, whereby when the bolster is rotated in a horizontal plane during certain conditions of service the diagonally oppositely disposed cooperating pairs of walls are in snug bearing contact substantially throughout their entire areas.

2. In a spring plankless self-aligning car truck of the class described, in combination, side frames having spaced bolster guiding columns, a bolster extending from one side frame to the other and guided for vertical reciprocation and slight horizontal rotation between said columns, the end portions of said bolster being widened and provided upon opposite sides with substantially triangular or wedge-shaped indentations having two vertical inwardly convergent walls, the mutually inwardly directed apices of said indentations defining the side margins of the window opening for the reception of the bolster ends, similar wedge-shaped projections on said guide columns, each having two inwardly converging walls and an apex interfitting with the indentations of the bolster ends with a slight clearance, the converging walls of the indentations in the bolster each making an angle of about 23½° with the axis of the bolster, and the corresponding walls of the guide column making an angle of about 25° with the said axis, whereby when the bolster is rotated in a horizontal plane during certain conditions of service the diagonally oppositely disposed cooperating pairs of walls are in snug bearing contact substantially throughout their entire areas.

3. In a spring plankless self-aligning car truck of the class described, in combination, side frames having spaced bolster guiding columns, a bolster extending from one side frame to the other and guided for vertical reciprocation and slight horizontal rotation between said columns, each of the end portions of said bolster being widened and provided upon each side thereof with a single indentation substantially triangular or wedge-shaped in horizontal section and having two vertical inwardly convergent walls, the two apices of said indentations being mutually inwardly directed and defining the side margins of the window opening for the reception of the bolster ends, a single similar wedge-shaped projection on each of said guide columns, each projection having two inwardly converging walls and an apex interfitting with the indentations of the bolster ends with a slight clearance, the angles between the converging walls of the bolster being slightly wider than the angles between the walls of the guide column projections, whereby when the bolster is rotated in a horizontal plane during certain conditions of service the diagonally oppositely disposed cooperating pairs of walls are in snug bearing contact substantially throughout their entire areas, the truck side frames having upper and lower horizontal members extending between said guide columns, and coil spring groups seated upon said lower members and supporting the ends of said bolster, said spring groups being disposed entirely within the space between the apices of the column projections of each side frame, and between the lateral confines of the side walls of the main portion of said bolster.

4. In a spring plankless self-aligning car truck of the class described, in combination, side frames having spaced bolster guiding columns, a bolster extending from one side frame to the other and guided for vertical reciprocation and slight horizontal rotation between said columns, the end portions of said bolster being widened and provided upon opposite sides with substantially triangular or wedge-shaped indentations having two vertical inwardly convergent walls, the mutually inwardly directed apices of said indentations defining the side margins of the window opening for the reception of the bolster ends, similar wedge-shaped projections on said guide columns, each having two inwardly converging walls and an apex interfitting with the indentations of the bolster ends with a slight clearance, the angles between the converging walls of the bolster being slightly wider than the angles between the walls of the guide column projections, whereby when the bolster is rotated in a horizontal plane during certain conditions of service the diagonally oppositely disposed cooperating pairs of walls are in snug bearing contact substantially throughout their entire areas, flanges formed on the sides of the widened end portions of said bolster adjacent the inner and outer edges of said indentation, said flanges extending in a direction generally parallel with the longitudinal center line of said truck and having inwardly facing surfaces embracing similarly formed substantially parallel side wall surfaces of said columns, there being a slight clearance between said coacting flange and side wall surfaces, whereby when said bolster is rotated, diagonally opposite pairs of said flange and wall surfaces are in contact, in addition to the wall contact between said wedge-shaped members.

5. In a spring plankless self-aligning car truck of the class described, in combination, side frames having spaced bolster guiding columns, a bolster extending from one side frame to the other and guided for vertical reciprocation and slight horizontal rotation between said columns, the end portions of said bolster being widened and provided upon opposite sides with substantially triangular or wedge-shaped indentations having two vertical inwardly convergent walls, the mutually inwardly directed apices of said indentations defining the side margins of the window opening for the reception of the bolster ends, similar wedge-shaped projections on said guide columns, each having two inwardly converging walls and an apex interfitting with the indentations of the bolster ends with a slight clearance, the angle of the indentations being greater than that of the projections by an amount equal to twice the angle of permitted horizontal rotation of said bolster with respect to said side frame, whereby when the bolster in rotated in a horizontal plane during certain conditions of service the diagonally oppositely disposed cooperating pairs of walls are in snug bearing contact substantially throughout their entire areas.

NORMAN B. AKITT.